United States Patent [19]

Lee et al.

[11] Patent Number: 5,952,408

[45] Date of Patent: Sep. 14, 1999

[54] FLAMEPROOF THERMOPLASTIC RESIN COMPOSITIONS

[75] Inventors: Kyu-cheol Lee; Sam-joo Yang; Bok-nam Jang, all of Seoul, Rep. of Korea

[73] Assignee: Cheil Industries, Inc., Taegu, Rep. of Korea

[21] Appl. No.: 09/020,618

[22] Filed: Feb. 9, 1998

Related U.S. Application Data

[63] Continuation-in-part of application No. 08/636,531, Apr. 23, 1996, abandoned, which is a continuation of application No. 08/361,645, Dec. 22, 1994, abandoned.

[30] Foreign Application Priority Data

Dec. 1, 1994 [KR] Rep. of Korea ..................... 94-32417

[51] Int. Cl.$^6$ ................................................... C08K 5/523
[52] U.S. Cl. ........................... 524/127; 524/141; 524/450
[58] Field of Search ..................................... 524/127, 450, 524/141

[56] References Cited

U.S. PATENT DOCUMENTS

| | | | |
|---|---|---|---|
| 3,428,595 | 2/1969 | Tsukada et al. | 524/450 |
| 3,544,033 | 12/1970 | Nikkeshi et al. | 524/450 |
| 3,673,146 | 6/1972 | Factor | 524/450 |
| 3,869,526 | 3/1975 | Combey et al. | 524/127 |
| 4,248,976 | 2/1981 | Clubley et al. | 524/141 |
| 4,425,448 | 1/1984 | Concannon et al. | 524/450 |
| 4,464,504 | 8/1984 | Kocsis et al. | 524/450 |
| 4,526,917 | 7/1985 | Axelrod . | |
| 4,556,684 | 12/1985 | Gunkel et al. . | |
| 4,692,488 | 9/1987 | Kress et al. | 524/141 |
| 4,785,042 | 11/1988 | Azuma et al. | 524/450 |
| 4,883,835 | 11/1989 | Buysch et al. | 524/141 |
| 4,914,144 | 4/1990 | Muehlbach et al. | 524/127 |
| 4,983,658 | 1/1991 | Kress et al. | 524/125 |
| 5,036,126 | 7/1991 | Rinehart | 524/141 |
| 5,122,556 | 6/1992 | Kambour | 524/141 |
| 5,135,973 | 8/1992 | Fukasawa et al. | 524/127 |
| 5,149,735 | 9/1992 | Bressan et al. | 524/450 |
| 5,204,394 | 4/1993 | Gosens et al. | 524/125 |
| 5,204,402 | 4/1993 | Foster et al. | 524/450 |
| 5,268,409 | 12/1993 | Asai et al. | 524/450 |
| 5,272,193 | 12/1993 | Fuhr | 524/141 |
| 5,276,078 | 1/1994 | Ogoe et al. | 524/125 |
| 5,290,836 | 3/1994 | Truyen | 524/127 |
| 5,292,786 | 3/1994 | Gaggar et al. | 524/127 |
| 5,302,646 | 4/1994 | Vilasaga et al. | 524/141 |
| 5,455,292 | 10/1995 | Kakegawa et al. | 524/127 |
| 5,510,413 | 4/1996 | McCullough et al. | 524/450 |

FOREIGN PATENT DOCUMENTS

| | | |
|---|---|---|
| 363608 | 8/1989 | European Pat. Off. . |
| 521628 | 6/1992 | European Pat. Off. . |
| 57-207641 | 12/1982 | Japan . |
| 6-228426 | 8/1984 | Japan . |
| 62-4747 | 2/1987 | Japan . |

*Primary Examiner*—Veronica P. Hoke
*Attorney, Agent, or Firm*—Maria Parrish Tungol

[57] ABSTRACT

The present invention relates to flameproof thermoplastic resin compositions comprising (A) a base resin comprising (1) 75 to 96% by weight of a thermoplastic, halogen-free polycarbonate, (2) 4 to 25% by weight of a styrene-containing graft copolymer, and (3) 0 to 10% by weight of a styrene-containing copolymer, (B) 5 to 20 parts by weight, per 100 parts by weight of the base resin (A), of a phosphate composition, and (C) 0.05 to 10 parts by weight, per 100 parts by weight of the base resin (A), of a zeolite. The addition of the zeolite component provides thermoplastic resin compositions with a good combination of physical properties, including improved long-term heat stability.

20 Claims, 2 Drawing Sheets

FLAMEPROOF THERMOPLASTIC RESIN COMPOSITIONS

This application is a continuation in part of Ser. No. 08/636,531 filed on Apr. 23, 1996 which is a continuation of application Ser. No. 08/361,645, filed Dec. 22, 1994, now abandoned.

FIELD OF THE INVENTION

The present invention relates to flameproof thermoplastic resin compositions, and specifically to those for molding, comprising a base resin comprising a halogen-free polycarbonate, a styrene-containing graft copolymer and a styrene-containing copolymer, a phosphate composition, and a zeolite. The thermoplastic resin compositions of the present invention may further contain additives such as anti-drip agents, inorganic fillers, heat stabilizers, dyes, or pigments in fractions as needed.

BACKGROUND OF THE INVENTION

Polycarbonate molding compositions are widely used for parts of automobiles and electrical products. They have a good combination of transparency, high impact strength and heat resistance. However, polycarbonate molding compositions do not have a good proccessability during molding process, so other resins are used with the polycarbonate resin. For example, a molding composition comprising a polycarbonate resin and a styrenic resin has good proccessability as well as high notched impact strength.

It is desirable to have a good balance of physical properties such as tensile strength, stiffness, compressive and shear strength as well as impact resistance in the polycarbonate blend compositions. These compositions are used in electric and electronic products such as computer monitor and copy machine housings where the composition is exposed to elevated temperatures, i.e., temperatures above room temperature, for extended time periods. If the composition cannot retain physical properties such as mechanical strength during such exposure, the lifetime of the product will be shortened because of the degradation of physical properties.

Therefore, in addition to absolute physical properties such as tensile strength and impact resistance, it is desirable to have compositions with good long-term heat stability, that is, the ability to maintain mechanical strength during exposure to elevated temperatures. Long-term heat stability is a different physical property from absolute tensile strength that is measured at a particular temperature and at a particular time. Long-term heat stability is a relative value that is measured over a time period. More specifically, long-term heat stability is the time period in which the tensile strength of a composition is reduced to one-half of the initial tensile strength during exposure to elevated temperature. Higher tensile strength does not necessarily correlate with good long-term heat stability. For example, even though resin A has greater tensile strength than resin B, resin B can have better long-term heat stability than resin A.

Furthermore, the polycarbonate molding composition used for housing materials of home appliances and computers should be flame resistant to prevent fires. For this purpose, halogen and/or antimony containing-compounds have been used to render flame retardancy to thermoplastic molding compositions. In U.S. Pat. Nos. 4,983,658 and 4,883,835, a halogen-containing compound is used as flame-retardant. The halogen-containing compound, however, results in the corrosion of the mold itself by the hydrogen halide gases released during a molding process and is fatally harmful due to the toxic gases liberated in the case of fire.

U.S. Pat. No. 4,692,488 discloses a thermoplastic molding composition comprising a halogen-free aromatic polycarbonate, a halogen-free thermoplastic copolymer of styrene and acrylonitrile, a halogen-free phosphorus compound, a tetrafluoroethylene polymer and graft polymers of ABS. The use of a phosphorus compound and a perfluoroalkane polymer to render flame retardancy to a polycarbonate/ABS resin composition, as disclosed in U.S. Pat. No. 4,692,488, herein incorporated by reference, prevents the dripping of flaming particles during combustion. U.S. Pat. No. 5,292,786, herein incorporated by reference, discloses flame retardant polymer blend compositions comprising a polycarbonate polymer, an ABS resin, a phosphate flame retardant compound and a polymethacrylate. The phosphate flame retardant compounds include monophosphate compounds and diphosphate compounds. Though the resin compositions disclosed in these U.S. patents have satisfactory flame retardancy, unsatisfactory surface crack due to the flame retardant migration during a molding process, called "juicing", might occur, thus degrading the physical properties of the resin composition. In order to prevent the juicing phenomenon, an oligomeric phosphate is used in the preparation of a polycarbonate/ABS resin composition, as disclosed in U.S. Pat. No. 5,204,394, herein incorporated by reference. This patent discloses a polymer mixture comprising an aromatic polycarbonate, a styrene-containing copolymer and/or styrene-containing graft copolymer and an oligomeric phosphate or a blend of oligomeric phosphates as flame retardant.

The use of halogen-free phosphate compositions as flame retardants avoids the problems caused by the corrosive by-products of chlorine or bromine-containing flame retardants. However, phosphate compounds have a tendency to decompose and reduce to phosphoric acid and other by-products when maintained at high temperatures such as 80° C. or above for an extended period of time. This phenomenon degrades the mechanical properties of the polycarbonate compositions. As discussed previously, long term heat stability is important in situations where the molded product is exposed to elevated temperatures for extended periods of time.

Zeolites are crystalline aluminosilicates of group IA and group IIA elements such as sodium, potassium, magnesium and calcium. Zeolites are well known and have been amply described in the literature, e.g., Kirk-Othmer, *Encyclopedia of Chemical Technology*, 4th Ed., John Wiley & Sons, New York, 1995, pp. 888–925, herein incorporated by reference. Zeolites have been used as adsorbents, industrial catalysts, and water softeners. Zeolites can be modified by ion exchange, however, cation exchange may produce considerable change in various other properties such as thermal stability, adsorption behavior, and catalytic activity (Kirk-Othmer, p. 901).

U.S. Pat. No. 4,464,504 discloses polystyrene and impact resistant polystyrene blend compositions that include zeolites having a pore size exceeding 0.43 nm. The zeolite is said to participate in the reduction of combustibility and smoke reduction of polystyrene. The effect can be further increased by changing the ions on the zeolite by ion exchange. The flame retardants for the compositions of U.S. Pat. No. 4,464,504 are bromine-containing compounds or $Sb_2O_3$. There is no disclosure of polycarbonate resins or phosphate flame retardants in this patent.

U.S. Pat. No. 5,149,735 discloses self-extinguishing polymeric compositions that comprise a thermoplastic polymer, an organic aliphatic or aromatic halogen-derivative, an adduct between an inorganic halide and a zeolite, and an organic reactive agent capable of modifying the polymeric matrix. In a Comparative Test, the use of a non-adduct zeolite such as zeolite 4A produced a material with poor self-extinguishment characteristics and was classified 94 V-2. There is no mention of flame retardant phosphate compositions in this patent.

Japanese Patent Application 63-170440 discloses the addition of zeolite containing a specific metal or preferably an organotin maleate to thermally stabilize a styrene-based resin composition containing a bromine based compound as a flame retardant. There is no mention of polycarbonate resins or flame retardant phosphate compositions. Japanese Patent Application 63-92661 discloses a low smoke emitting resin composition that is prepared by combining a halogen-containing polymer with at least one aluminosilicate from the group consisting of clay, mica, and zeolite that has been fired with a zinc compound. There is no disclosure of polycarbonate resins as a resin component or phosphate compositions as flame retardants. The processes described above involve the modification of zeolite by reaction or ion exchange. Therefore, these processes requires more starting materials, resources, and processing steps in the overall manufacturing process. The use of halogen-containing flame retardants or a halogenated polymer would be expected to produce problems with the release of corrosive and toxic materials during high temperature processing or combustion.

Accordingly, in order to overcome the shortcomings mentioned above, the present inventors have developed a new resin composition comprising a base resin comprising a halogen-free polycarbonate, a styrene-containing graft copolymer and a styrene containing copolymer, a flame retardant phosphate composition, and a zeolite.

OBJECTS OF THE INVENTION

An object of the present invention is to provide a flameproof thermoplastic resin composition with a good combination of processability, appearance and flame retardency together with long-term heat stability which comprises a base resin comprising a halogen-free polycarbonate, a styrene-containing graft copolymer and a styrene-containing copolymer, a flame retardant phosphate composition, and a zeolite.

SUMMARY OF THE INVENTION

The present invention relates to flameproof thermoplastic resin compositions comprising (A) a base resin comprising (1) 75 to 96% by weight of a thermoplastic, halogen-free polycarbonate, (2) 4 to 25% by weight of a styrene-containing graft copolymer with a graft index of 40 or above, which is obtained by grafting monomers of styrene, methylmethacrylate and acrylonitrile onto a butadiene rubber, and (3) 0 to 10% by weight of a styrene-containing copolymer obtained by copolymerizing styrene and acrylonitrile, (B) 5 to 20 parts by weight, per 100 parts by weight of the base resin(A), of a flame retardant phosphate composition, and (C) 0.05 to 10 parts by weight, per 100 parts by weight of the base resin(A), of a zeolite. The thermoplastic resin compositions according to the present invention are free of chlorine or bromine-containing materials that release corrosive or toxic materials during processing or combustion.

DETAILED DESCRIPTION OF THE INVENTION

Figure 1:
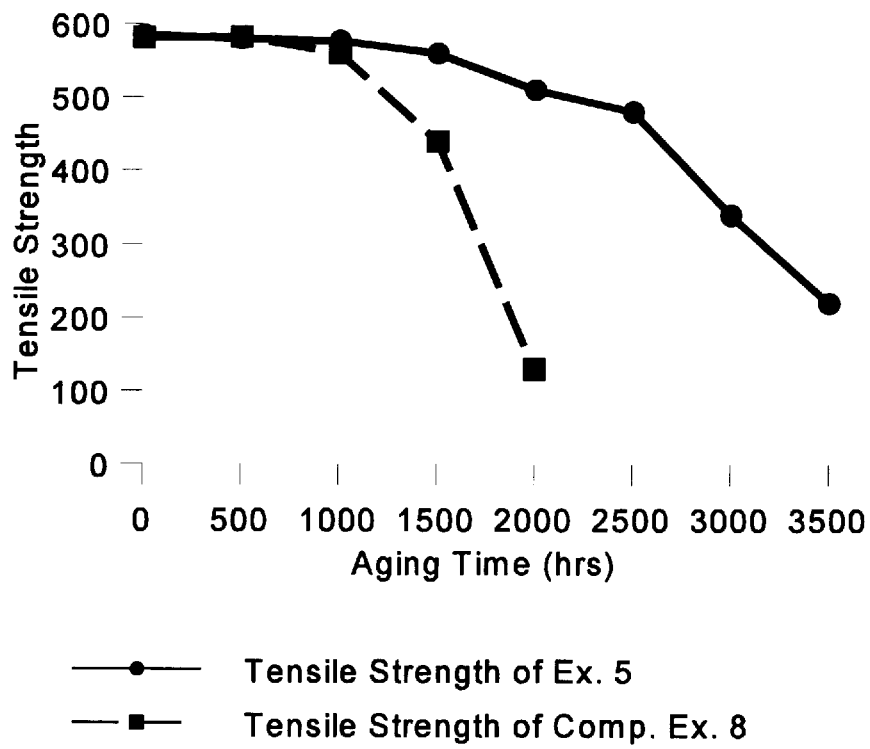
FIG. 1 is a graph showing the effect of the zeolite on the tensile strength of the thermoplastic composition as a function of aging time at elevated temperature. Both samples contain triphenylphosphate as the flame retardant.

The flameproof thermoplastic resin compositions according to the invention comprise a base resin (A), a flame retardant phosphate composition (B), and a zeolite (C). The flameproof thermoplastic resin composition according to the present invention are advantageously free of chlorine or bromine-containing materials such as the bromine-containing flame retardant compounds, halogen-containing zeolite adduct products, and chlorinated polymers such as polyvinylchloride that are disclosed in the prior art discussed previously. Compounds containing chlorine or bromine can cause corrosion within a mold by release of hydrogen halide gas during the molding process. Chlorine or bromine-containing compounds and chlorinated polymers can also emit toxic gases while burning in the case of a fire.

The detailed descriptions of each component follows.

(A) Base Resin

The base resin used in this invention is a blend of a halogen-free polymers comprising thermoplastic, halogen-free polycarbonate, a styrene-containing graft copolymer and a styrene-containing copolymer. More particularly, the base resin contains 75 to 96% by weight of a thermoplastic, halogen-free polycarbonate, 4 to 25% by weight of a styrene containing graft copolymer, and 0 to 10% by weight of a styrene-containing copolymer.

According to substituted groups of the polycarbonate, there are aromatic polycarbonates, aliphatic polycarbonates, and aromatic/aliphatic polycarbonates, and a polycarbonate or a blend of the polycarbonates may be used in this invention. Aromatic polycarbonates are preferable, and aromatic polycarbonates synthesized from 2, 2'-bis(4-hydroxylphenyl)propane, called "Bisphenol A", are preferred.

The styrene-containing graft copolymer is prepared by grafting monomers of 30 to 70% by weight of styrene, preferably 30 to 60% by weight of styrene, 0 to 20% by weight of methylmethacrylate and 0 to 30% by weight of acrylonitrile, preferably 10 to 30% by weight of acrylonitrile, onto 30 to 70% by weight of a butadiene rubber, preferably 30 to 60% by weight of butadiene rubber. An exemplary copolymer of the styrene-containing graft copolymer is known as ABS (acrylonitrile/butadiene/styrene) resin. In this invention, it is preferable that the styrene-containing graft copolymer have a graft index of 40 or above, and a gel content of 70% by weight or above, when the copolymer is dissolved in acetone.

A specific example of the styrene-containing copolymer is SAN (styrene/acrylonitrile) resin, which is prepared by copolymerizing styrene and acrylonitrile. In the copolymerization, 60 to 90% by weight of styrene and 40 to 10% by weight of acrylonitrile are used.

The styrene-containing graft copolymer and the styrene-containing copolymer may be produced according to conventional polymerization processes. In particular, for production of styrene-containing graft copolymer, an emulsion polymerization process may be preferably employed.

The base resin of the invention should contain 75 to 96% by weight of a polycarbonate in the resin composition of this invention. If the amount of the polycarbonate is less than 75% by weight, the resin composition has poor flame retardency. On the other hand, if the amount of the polycarbonate is in excess of 96% by weight, the resin composition has poor notched impact strength.

The base resin is the main component of the thermoplastic composition of the present invention. The amount of base resin by weight in a particular thermoplastic composition is the difference between the total weight of the composition and the sum of the weight of components (B), (C), and any additives present in the composition.

(B) Flame Retardant Phosphate Composition

The flame retardant phosphate compositions used in the present invention include monomeric phosphate esters, oligomeric phosphate esters, and mixtures thereof. Monomeric phosphate esters are known as flame retardants for polycarbonate compositions. Examples of monomeric phosphates, also known as monophosphates are triphenylphosphate, tri(2,6-dimethylphenyl)phosphate, tri(4-methyl-phenyl) phosphate, tricresylphosphate, diphenyl 2-ethylcresylphosphate, diphenylcresylphosphate, tri (isopropylphenyl)phosphate, trixylenylphosphate, xylenyldiphenylphosphate, and mixtures thereof. Triphosphates such as phloroglucinol-tris(diphenyl)phosphate may also be used as flame retardants in the present invention. Although problems can arise with juicing during processing, monomeric phosphate esters often provide better flame retardancy than oligomeric phosphates in polycarbonate compositions.

Oligomeric phosphates or mixtures thereof can be used in the present invention to reduce the possibility of juicing. Examples of oligomeric arylphosphate flame retardants that can be used in the present invention include those described in the prior art such as U.S. Pat. No. 5,204,394. Examples of oligomeric diphosphates include hydroquinol-bis(diphenyl) phosphate, resorcinol-bis (diphenyl)phosphate, Bisphenol A-bis(diphenyl)phosphate, hydroquinol-bis(dicresyl) phosphate, resorcinol-bis(dicresyl)phosphate, Bisphenol A-bis(dicresyl) phosphate, and mixtures thereof.

The preferred flame retardant phosphate compositions are mixtures of monomeric and oligomeric arylphosphates wherein the average number of phosphorous atoms in the mixture is 1.3 to 2.4.

Oligomeric arylphosphates particularly useful in the present invention also include those represented in the general formula (I):

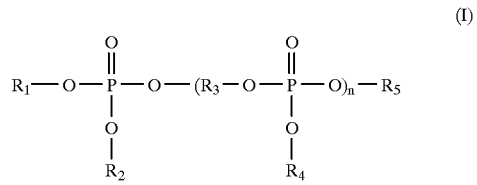

wherein $R_1$, $R_2$, $R_3$, $R_4$, and $R_5$ independently of one another are $C_6$–$C_{20}$ aryl or alkyl-substituted $C_6$–$C_{20}$ aryl, and n is 0 to 5, and the average n of the phosphate composition is about 0.3 to about 1.4, preferably about 0.3 to about 0.8. The preferred flame retardant phosphate compositions are blends of monomeric and oligomeric arylphosphates where the average n of the phosphate composition is about 0.3 to about 0.8. For the phosphate compositions to have an average n from 0.3 to 0.8, the phosphate compositions contain 30 to 60% by weight of monomeric triarylphosphates and 70 to 40% by weight of oligomeric arylphosphates.

When only monomeric triarylphosphates with n=0 are only used in a resin composition, a juicing problem might appear during molding processes, because the monomeric triarylphosphates are volatilized at about 230° C. or above. If a blend of phosphates with an average n of 0.8 or above is used in a resin composition, a juicing problem can be improved, but the flame retardancy and physical properties of the resin deteriorate. The phosphates with an average n from 0.3 to 0.8 may be preferably used in this invention so as to improve the physical properties as well as flame retardency of the resin compositions.

(C) Zeolite

The zeolites that are useful in compositions of the present invention are zeolites that known in the art and described in the literature such as Kirk-Othmer. Such known zeolites include zeolite A and zeolite X. However, the polycarbonate-based compositions of the present invention do not require modified zeolites such as those disclosed in U.S. Pat. No. 5,149,735, U.S. Pat. No. 4,464,504, or Japanese patent applications 63-92661 or 63-170440. The advantages of using non-adduct zeolites, that is, zeolites that are not adduct products produced by reaction with inorganic halides, include the ability to use commercially available zeolites without further treatment, the reduction of process steps associated with adduct product formation, and the elimination of halogen-containing materials such as halogen-containing adduct products that could cause corrosion or toxic gases during processing or combustion. By using unmodified zeolites, that is, zeolites that are not ion-exchanged and not reacted with compounds such as zinc compounds, the additional process steps associated with the ion-exchange or reaction are avoided. Also, ion-exchange is known to change the thermal stability, molecular-sieve behavior and adsorption selectivity of zeolites. These changes can be avoided by using unmodified zeolites. Therefore, the preferred zeolites are non-adduct zeolites and zeolites unmodified by ion-exchange or reaction with compounds such as zinc compounds.

Examples of the preferred zeolites are zeolite A or zeolite X having a pore size of 2 to 10 Å. The compositions according to the present invention typically contain 0.05 to 10 parts by weight of a zeolite per 100 parts by weight of the base resin.

It is believed that a phosphate composition such as phosphates is reduced to a phosphoric acid by degradation of itself at a high temperature for a long time. Accordingly, conventional polycarbonates containing such phosphate compositions show poor mechanical properties, i.e. tensile strength, when they are kept at a high temperature for a long time. When oligomeric phosphates of formula (I) are used, the higher the average n in the formula (I) is, the greater the degradation of the mechanical strength of the polycarbonates after aging for a long time. Also, the mechanical strength of the conventional polycarbonates decreases when they are kept at 80° C. or above for many hours. Addition of zeolite to a polycarbonate resin provides excellent long term heat stability. It is believed that zeolite absorbs some molecules and ions that might degrade the physical properties of the resin. In other words, the molecules and ions which are produced at a high temperature can be blocked in the pores of the zeolite.

The flameproof thermoplastic resin compositions according to the present invention may further include additives such as anti-drip agents, inorganic fillers, heat stabilizers, oxidation inhibitors, light stabilizers, pigments and/or dyes depending on specific applications. A preferred anti-drip agent comprises a perfluoroalkane polymer. Examples of perfluoroalkane polymers are polytetrafluoroethylene, polyvinylidene fluoride, copolymer of polytetrafluoroethylene and polyvinylidenefluoride, copolymer of tetrafluoroethylene and fluoroalkylvinylether, and copolymer of tetrafluoroethylene and hexafluoropropylene. At least one of the perfluoroalkane polymers may be used in the flameproof thermoplastic resin compositions. The perfluoroalkane polymer decreases the melting flow of the flameproof thermoplastic resin during combustion by forming a fibrillar network in the resin and increases the shrinkage of the resin, thereby preventing the dripping of the melting resin during combustion. The perfluoroalkane polymer may be preferably used in a form of powder so as to disperse and blend evenly in a flameproof thermoplastic resin composition. Polytetrafluoroethylene with a particle size of 20 to 500$\mu$ is conventionally available for this invention. 0.1 to 2.0 parts by weight of a perfluoroalkane polymer per 100 parts by weight of the base resin is blended.

Examples of the inorganic fillers are asbestos, glass fiber, talc, or ceramic. Other additives are conventionally available to a skilled person in this technical field. The additives may be blended in a resin composition in amounts up to about 30 parts by weight per 100 parts by weight of the base resin.

The flameproof thermoplastic resin compositions are prepared by blending a base resin, a phosphate composition, and a zeolite with a conventional mixer. Additives may be included in the blend. The flameproof thermoplastic resin compositions are prepared in pellet form by extruding the blend with a conventional extruder.

The thermoplastic compositions of the present invention advantageously are free of the bromine flame retardants described in U.S. Pat. No. 4,464,504 and Japanese Patent Application 63-170440 and polyvinyl polymers such as those disclosed in Japanese Patent Application 63-92661. The flameproof thermoplastic resin compositions containing a zeolite prevent the emission of toxic gases during combustion, and have a good combination of heat resistance, juicing phenomenon, processability, appearance, flame retardency together with long term heat stability at high temperatures.

The invention may be better understood by reference to the following examples that are intended for the purpose of illustration and are not to be construed as in any way limiting the scope of the present invention, which is defined in the claims appended hereto.

EXAMPLES

The components to prepare flameproof thermoplastic resin compositions in Examples 1–4 and Comparative Examples 1–15 are as follows:

(A) Base Resin (1) Polycarbonate: L-1225L Grade of Teijin, Inc. of Japan was used.

(2) Styrene-containing graft copolymer (ABS)

50 grams of butadiene latex in powder, 36 g of styrene, 14 g of acrylonitrile, and 150 g of deionized water were mixed, and 1.0 g of potassium oleic acid, 0.4 g of cumyl hydroperoxide, and 0.3 g of a grafting reagent were added to the mixed solution. The resultant solution was kept at 75° C. for 5 hours to prepare a graft copolymer of ABS. To the graft copolymer, 0.3 g of $H_2SO_4$ was added to prepare ABS resin in powder.

(3) Styrene-containing copolymer (SAN)

70 g of styrene, 30 g of acrylonitrile, and 120 g of deionized water were mixed, and 0.2 g of azobisisobutylonitrile and 0.5 g of tricalciumphosphate were added to the mixed solution. SAN copolymer was prepared by suspension polymerization by washing, dehydrating, and drying the resultant product. SAN copolymer in powder form was obtained.

(B) Flame Retardant Phosphate Composition

Triphenylphosphate (TPP) (n=0): a triphenylphosphate of Daihachi Co., of Japan was used.

Oligomeric phosphate (CR-733S(n=1.4)): CR-733S of Daihachi Co., of Japan was used.

Synthetic oligomeric phosphate (SOP (n=0.6)): 114.7 g of phenol, 220 g of resorcinol, and 0.2 g of dichloromagnesium were added to 100 ml of benzene. The solution was heated to 70° C. 82.8 g of trichlorophosphinoxide was dropped in the solution over 2 hours at the temperature of 70° C. The resultant solution was stirred at 120° C. over 3 hours not to release hydrogen chloride gas any more. The solvent and impurities were extracted from the solution so as to prepare synthetic oligomeric phosphate in liquid at room temperature having n of 0.6 in the general formula (I).

(C) Zeolite

Zeolite 13X of Union Carbide Corp. of U.S.A. was used. The zeolite was not modified by adduct formation, dehydration, or ion exchange.

In the Examples and Comparative Examples, the components were blended and extruded in pellet form with a twin-screw extruder at 250° C. Thereafter, the resin pellets were molded into test specimens.

Examples 1–2 and Comparative Examples 1–6

The compositions of each component used in Examples 1–2 and Comparative Examples 1–6 and the physical properties are shown in Table 1. Teflon® 7AJ of Dupont, Inc. (U.S.A.) was used as an anti-drip agent.

As shown in Table 1, Examples 1, 1A, 1B, and 2 show good combinations of physical properties in flame retardency, impact strength, and long-term heat stability. In Comparative Examples 1 and 2, the long-term heat stability was much less than that of Examples 1 and 1A. The long-term heat stability of Comparative Example 1 is much less than that of Example 1A when the same amount of monomeric phosphate is used. Examples 1 and 2 are superior to Comparative Example 6 in long-term heat stability. In Comparative Examples 3, 4 and 5, impact strength and long-term heat stability were poor. Example 1B that used the same phosphate component has significantly better long-term heat stability.

The impact strength values of Examples 1, 1A, and 1B are slightly less than the impact strength values of Comparative Examples 1, 3, and 6 that use corresponding flame retardants. This effect is quite different from the significant improvement in impact resistance observed with the polystyrene compositions of U.S. Pat. No. 4,464,504 (Kocsis et al.). These results show that the zeolites have different effects on physical properties in polycarbonate blend compositions compared to the effect on physical properties of the polystyrene compositions of U.S. Pat. No. 4,464,504.

TABLE 1

|  |  |  | Examples | | | | Comparative Examples | | | | | |
|---|---|---|---|---|---|---|---|---|---|---|---|---|
|  |  |  | 1 | 1A | 1B | 2 | 1 | 2 | 3 | 4 | 5 | 6 |
| Components | | | | | | | | | | | | |
| (A) | (1) | polycarbonate | 80 | 80 | 80 | 80 | 80 | 80 | 80 | 80 | 80 | 80 |
|  | (2) | ABS | 10 | 10 | 10 | 10 | 10 | 10 | 10 | 10 | 10 | 10 |
|  | (3) | SAN | 10 | 10 | 10 | 10 | 10 | 10 | 10 | 10 | 10 | 10 |
| (B) | (1) | TPP (n = 0) | — | 13 | — | — | 13 | 14 | — | — | — | — |
|  | (2) | CR-733S (n = 1.4) | — | — | 13 | — | — | — | 13 | 14 | 15 | — |
|  | (3) | SOP(n = 0.6) | 13 | — | — | 14 | — | — | — | — | — | 13 |
| (C) | Teflon ® | | 0.5 | 0.5 | 0.5 | 0.5 | 0.5 | 0.5 | 0.5 | 0.5 | 0.5 | 0.5 |
| (D) | Zeolite 13X | | 0.6 | 0.6 | 0.6 | 0.6 | — | — | — | — | — | — |
| Physical Properties | | | | | | | | | | | | |
| UL 94 VB (1/16")* | | | V0 | V0 | V1 | V0 | V0 | V0 | V1 | V1 | V0 | V0 |
| Impact Strength (1/8")** | | | 57 | 61 | 47 | 53 | 62 | 54 | 49 | 46 | 40 | 59 |
| Heat Resistance (VST)*** | | | 93.2 | 90.8 | 96.9 | 90.7 | 90.2 | 86.8 | 96.1 | 93.3 | 90.6 | 92.7 |
| Juicing**** | | | X | ○ | X | X | ○ | ○ | X | X | X | X |
| Long-term heat stability***** | | | 2340 | 2750 | 1650 | — | 1550 | — | 920 | — | — | 1270 |

All numerals of the components are in grams.
Notes: *UL 94 VB(1/16") was tested according to UL 94 VB.
**Impact strength (kgf · cm/cm) was tested according to ASTM D256.
***Heat resistance (VST) (Vicat Softening Temperature) was tested according to ASTM D1525.
****Juicing was observed with an optical microscope, after the specimens were kept at 80° C. for 24 hours. (X: Juicing was not observed, ○: Juicing was observed)
*****Time (hours) that tensile strength reaches to half of the initial tensile strength when the test specimens were kept in an oven at 100° C.. Tensile strength was measured according to ASTM D-638.

Examples 3–4 and Comparative Examples 7–12

In Examples 3–4 and Comparative Examples 7–12, SAN copolymer was not used. The compositions of each component used in Examples 3–4 and Comparative Examples 7–12 and the physical properties are shown in Table 2.

Examples 3 and 4 show good combinations of physical properties in flame retardancy, impact strength, juicing and long-term heat stability. In Comparative Examples 7–12, impact strength and long-term heat stability were poor compared to Example 4 (and Examples 5 and 6 in Table 3). In particular, Example 4 (with a zeolite) is superior to Comparative Examples 12 (without a zeolite) in long-term heat stability even though the same phosphate component is used in both Examples. It is noted that the impact strength of the composition is not significantly affected by the presence of the zeolite.

TABLE 2

|  |  |  | Examples | | Comparative Examples | | | | | |
|---|---|---|---|---|---|---|---|---|---|---|
|  |  |  | 3 | 4 | 7 | 8 | 9 | 10 | 11 | 12 |
| Components | | | | | | | | | | |
| (A) | (1) | polycarbonate | 90 | 90 | 90 | 90 | 90 | 90 | 90 | 90 |
|  | (2) | ABS | 10 | 10 | 10 | 10 | 10 | 10 | 10 | 10 |
|  | (3) | SAN | — | — | — | — | — | — | — | — |
| (B) | (1) | TPP(n = 0) | — | — | 8 | 9 | — | — | — | — |
|  | (2) | CR-733S (n = 1.4) | — | — | — | — | 8 | 9 | 10 | — |
|  | (3) | SOP(n = 0.6) | 8 | 9 | — | — | — | — | — | 9 |
| (C) | Teflon ® | | 0.5 | 0.5 | 0.5 | 0.5 | 0.5 | 0.5 | 0.5 | 0.5 |
| (D) | Zeolite 13X | | 0.6 | 0.6 | — | — | — | — | — | — |
| Physical Properties | | | | | | | | | | |
| UL 94 VB(1/16")* | | | V0 | V0 | V0 | V0 | V2 | V1 | V0 | V0 |
| Impact Strength (1/8")** | | | 68 | 65 | 70 | 66 | 57 | 55 | 52 | 66 |
| Heat Resistance(VST)*** | | | 108.4 | 105.2 | 105.3 | 101.9 | 111.5 | 108.1 | 104.9 | 105.3 |
| Juicing**** | | | X | X | ○ | ○ | X | X | X | X |
| Long-term heat stability***** | | | — | 2850 | — | 1740 | — | 1120 | — | 1410 |

All numerals of the components are in grams.
Notes: *UL 94 VB(1/16") was tested according to UL 94 VB.
**Impact strength (kgf · cm/cm) was tested according to ASTM D256.
***Heat resistance was tested according to ASTM D1525.

TABLE 2-continued

|  | Examples | | | Comparative Examples | | | | |
|---|---|---|---|---|---|---|---|---|
|  | 3 | 4 | 7 | 8 | 9 | 10 | 11 | 12 |

****Juicing was observed with an optical microscope, after the specimens were kept at 80° C. for 24 hours. (X: Juicing was not observed, ○: Juicing was observed)
*****Time (hours) that tensile strength reaches to half of the initial tensile strength when the test specimens were kept in an oven at 100° C.. Tensile strength was measured according to ASTM D-638.

Examples 4–6 and Comparative Examples 12–15

In Examples 4–6 and Comparative Examples 12–15, SAN copolymer was not used. Examples 4, 5, and 6 show the improvement in long-term heat stability irrespective of the type of phosphate component when compared with corresponding Comparative Examples 8, 10, and 12. Comparative Examples 13 and 14 show the effect of omitting the phosphate component from the composition and Comparative Example 15 shows the effect of the use of a filler, talc, instead of the zeolite component. The talc used in Comparative Example 15 was Talc HST-0.5 of Hayashi Kasei of Japan.

The long-term heat stability of Example 5 (3200) is significantly greater than that of Comparative Example 8 (1740) without the zeolite component when using the same base resin and phosphate component. Example 6 shows better long-term heat stability than Comparative Examples 9, 10, and 11 where the same phosphate component is used.

It is noted that the impact strength of Example 5 is slightly less than that of Comparative Example 8. The impact strength of Example 6 is the same or slightly less than the impact strength of Comparative Examples 9, 10, and 11. These results show that the zeolites have different effects on physical properties in polycarbonate compositions compared to the effect on physical properties of the polystyrene compositions of U.S. Pat. No. 4,464,504.

Comparative Examples 13 and 14 show that the zeolite has no significant effect on long-term heat stability when there is no phosphate component. Comparative Example 15 with talc as a filler has a much lower long-term heat stability than Example 4 that uses the zeolite according to the present invention. Comparative Example 15 also has a lower long-term heat stability than Comparative Example 12 that does not have a zeolite component. The impact strength of Comparative Example 15 is less than that of Comparative Example 12 that does not contain either the zeolite component or talc. Therefore, the presence of a known filler does not necessarily improve physical properties such as impact strength and long-term heat stability in the polycarbonate compositions of the present invention.

TABLE 3

|  | Examples | | | Comparative Examples | | | |
|---|---|---|---|---|---|---|---|
|  | 4 | 5 | 6 | 12 | 13 | 14 | 15 |
| Components |  |  |  |  |  |  |  |
| (A) (1) polycarbonate | 90 | 90 | 90 | 90 | 90 | 90 | 90 |
| (2) ABS | 10 | 10 | 10 | 10 | 10 | 10 | 10 |
| (3) SAN | — | — | — | — | — | — | — |
| (B) (1) TPP(n = 0) | — | 9 | — | — | — | — | — |
| (2) CR-7335(n = 1.4) | — | — | 9 | — | — | — | — |
| (3) SOP(n = 0.6) | 9 | — | — | 9 | — | — | 9 |
| (C) Teflon ® | 0.5 | 0.5 | 0.5 | 0.5 | 0.5 | 0.5 | 0.5 |
| (D) Zeolite 13X | 0.6 | 0.6 | 0.6 | — | 0.6 | — | — |
| Talc | — | — | — | — | — | — | 0.6 |
| Physical Properties |  |  |  |  |  |  |  |
| UL 94 VB (1/16")* | V0 | V0 | V0 | V0 | Fail | Fail | V0 |
| Impact Strength(1/8")** | 65 | 63 | 52 | 66 | 76 | 75 | 60 |
| Heat Resistance (VST)*** | 105.2 | 102.8 | 107.2 | 105.3 | 136.1 | 134.6 | 105.9 |
| Juicing**** | X | ○ | X | X | X | X | X |
| Long term heat stability***** | 2850 | 3200 | 1800 | 1410 | 7150 | 7110 | 1070 |

All numerals of the components are in grams.
Notes: *UL 94 VB(1/16") was tested according to UL 94 VB.
**Impact strength (kgf · cm/cm) was tested according to ASTM D256.
***Heat resistance was tested according to ASTM D1525.
****Juicing was observed with an optical microscope, after the specimens were kept at 80° C. for 24 hours. (X: Juicing was not observed, ○: Juicing was observed)
*****Time (hours) that tensile strength reaches to half of the initial tensile strength when the test specimens were kept in an oven at 100° C.. Tensile strength was measured according to ASTM D-638.

The following tables illustrate the improvement in long-term heat stability obtained by the zeolite component in the compositions of the present invention when used with different phosphate components. The compositions according to the invention maintain their tensile strength when exposed to elevated temperature much longer than compositions without the zeolite component.

TABLE 4

Long-term Heat Stability with Triphenylphosphate (TPP) (n = 0)

| Aging Time(hrs) | 0 | 500 | 1000 | 1500 | 2000 | 2500 | 3000 | 3500 |
|---|---|---|---|---|---|---|---|---|
| Tensile Strength of Example 5 (kgf/cm$^2$) | 585 | 580 | 577 | 560 | 510 | 480 | 340 | 220 |
| Tensile Strength of Comparative Example 8 (kgf/cm$^2$) | 582 | 583 | 560 | 440 | 130 | | | |

The above comparison of tensile strength as a function of aging time at elevated temperature is shown graphically in FIG. 1.

TABLE 5

Long-term Heat Stability with Synthetic oligomeric phosphate (SOP) (n = 0.6)

| Aging Time(hrs) | 0 | 500 | 1000 | 1500 | 2000 | 2500 | 3000 |
|---|---|---|---|---|---|---|---|
| Tensile Strength of Example 4 (kgf/cm$^2$) | 610 | 612 | 584 | 552 | 529 | 450 | 245 |
| Tensile Strength of Comparative Example 12 (kgf/cm$^2$) | 607 | 602 | 507 | 258 | 153 | | |

Figure 2:
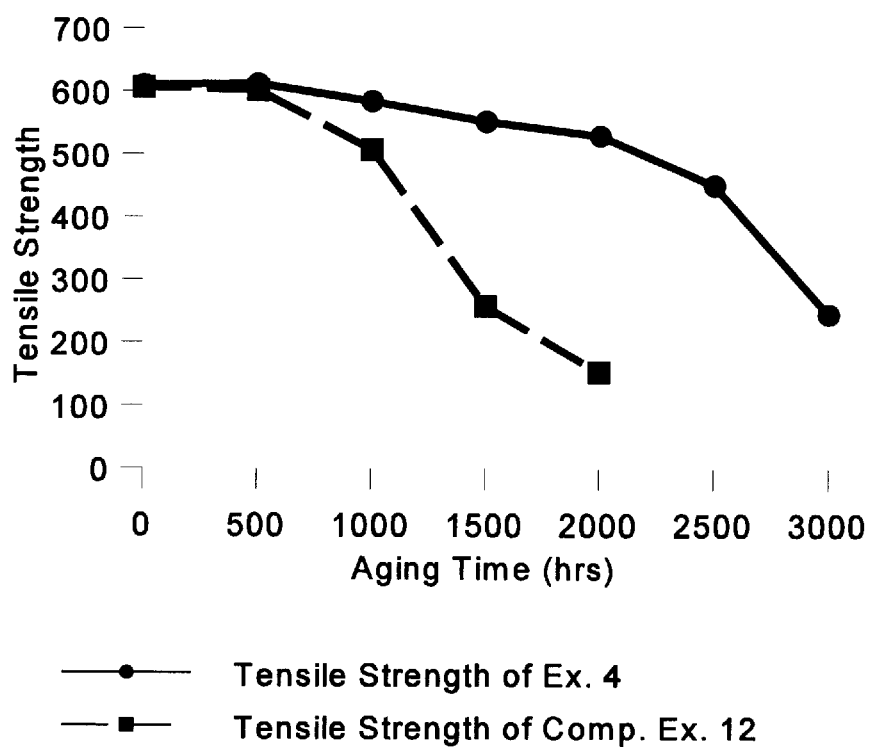
FIG. 2 is a graph showing the effect of the zeolite on the tensile strength of the thermoplastic composition as a function of aging time at elevated temperature when synthetic oligomeric phosphate is used as the flame retardant.

The above comparison of tensile strength as a function of aging time at elevated temperature is shown graphically in FIG. 2.

TABLE 6

Long-term Heat Stability with Oligomeric Phosphate (CR-733S (n = 1.4))

| Aging Time(hrs) | 0 | 500 | 1000 | 1500 | 2000 |
|---|---|---|---|---|---|
| Tensile Strength of Example 6 (kg/cm$^2$) | 630 | 620 | 590 | 450 | 225 |
| Tensile Strength of Comparative Example 10 (kg/cm$^2$) | 632 | 560 | 380 | 80 | |

Figure 3:
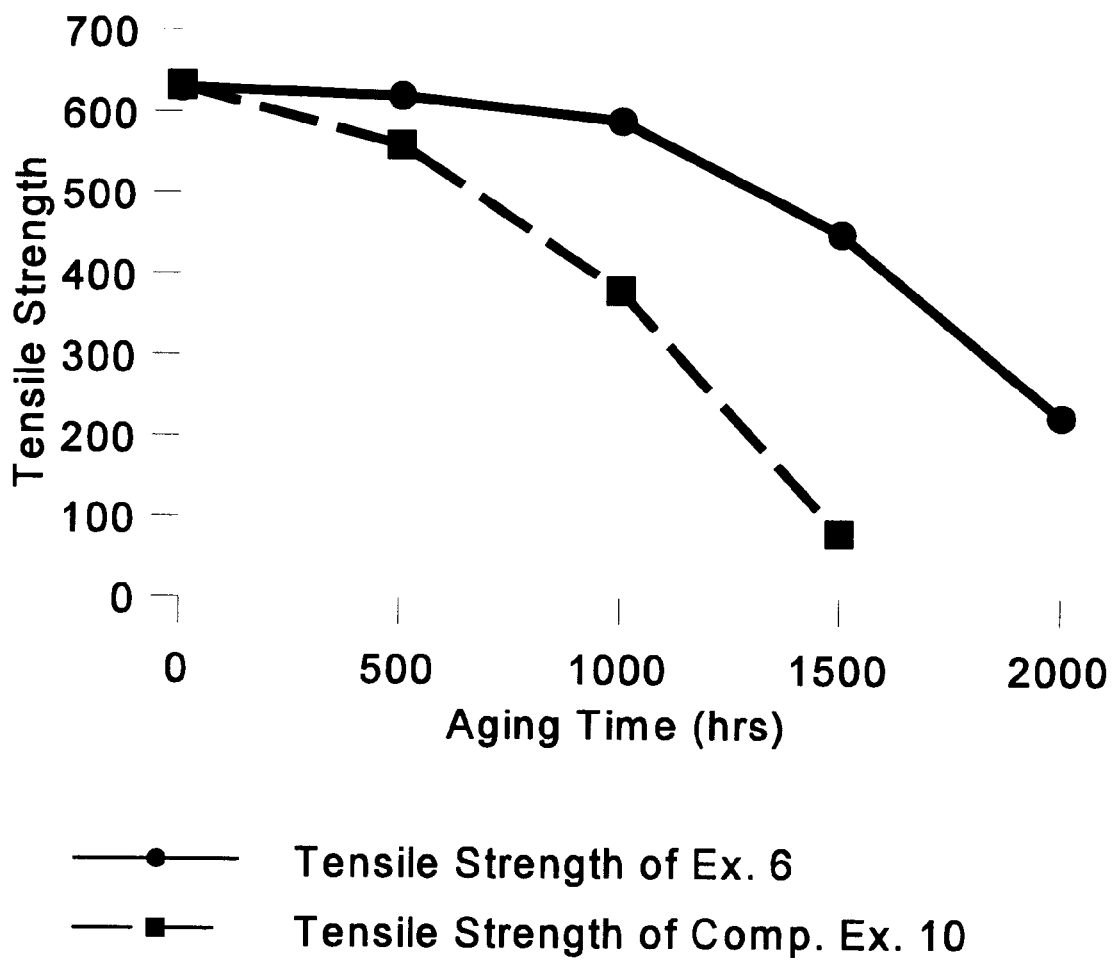
FIG. 3 is a graph showing the effect of the zeolite on the tensile strength of the thermoplastic composition as a function of aging time at elevated temperature. Both samples contain an oligomeric phosphate as the flame retardant.

The above comparison of tensile strength as a function of aging time at elevated temperature is shown graphically in FIG. 3.

The tables and graphs show the advantage of improved long-term heat stability provided by the zeolite. The results show that the thermoplastic compositions according to the present invention are able to maintain their tensile strength for a significantly longer time compare to compositions that do not contain zeolite.

What is claimed is:

1. A flameproof thermoplastic resin composition comprising:
   (A) a base resin comprising:
      (1) 75 to 96% by weight of a thermoplastic, halogen-free polycarbonate,
      (2) 4 to 25% by weight of a styrene-containing graft copolymer, and
      (3) 0 to 10% by weight of a styrene-containing copolymer;
   (B) 5 to 20 parts by weight, per 100 parts by weight of the base resin(A), of at least one organic phosphate flame retardant, and
   (C) 0.05 to 10 parts by weight, per 100 parts by weight of the base resin (A), of a zeolite, wherein said thermoplastic resin composition is free of chlorine or bromine-containing materials that emit corrosive or toxic material during polymer processing conditions or combustion.

2. The thermoplastic resin composition of claim 1 wherein said styrene-containing graft copolymer is prepared by grafting monomers of 30 to 70% by weight of styrene, 0 to 20% by weight of methylmethacrylate and 0 to 30% by weight of acrylonitrile onto 30 to 70% by weight of a butadiene rubber.

3. The thermoplastic resin composition of claim 1 wherein said styrene-containing graft copolymer is prepared by grafting monomers of 30 to 60% by weight of styrene, 0 to 20% by weight of methylmethacrylate and 10 to 30% by weight of acrylonitrile onto 30 to 60% by weight of a butadiene rubber.

4. The thermoplastic resin composition of claim 1 wherein said styrene-containing graft copolymer is an ABS resin.

5. The thermoplastic resin composition of claim 1 wherein said styrene-containing copolymer is a SAN resin prepared by copolymerizing styrene and acrylonitrile.

6. The thermoplastic resin composition of claim 1 wherein said flame retardant is a monophosphates ester, an oligomeric phosphate ester, or a mixture thereof.

7. The thermoplastic resin composition of claim 1 wherein the flame retardant composition is triphenylphosphate, tri(2,6-dimethylphenyl)phosphate, tri(4-methyl-phenyl) phosphate, tricresylphosphate, diphenyl 2-ethylcresylphosphate, diphenylcresylphosphate, tri(isopropylphenyl)phosphate, trixylenylphosphate, xylenyl-diphenylphosphate or a mixture thereof.

8. The thermoplastic resin composition of claim 1 wherein said flame retardant is an oligomeric phosphate or a mixture thereof.

9. The thermoplastic resin composition of claim 1 wherein said flame retardant is hydroquinol-bis(diphenyl)phosphate, resorcinol-bis(diphenyl)phosphate, Bisphenol A-bis(diphenyl)phosphate, hydroquinol-bis(dicresyl)phosphate, resorcinol-bis(dicresyl)phosphate, Bisphenol A-bis(dicresyl)phosphate, phloroglucinol-tris(diphenyl) phosphate or a mixture thereof.

10. The thermoplastic resin composition of claim 1 wherein said flame retardant is mixture of oligomeric phosphates wherein the average number of phosphorous atoms is about 1.3 to about 2.4.

11. The thermoplastic resin composition of claim 1 wherein said flame retardant is a phosphate composition of the general formula:

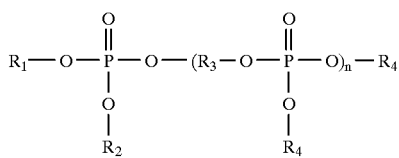

wherein $R_1$, $R_2$, $R_3$, $R_4$, and $R_5$ independently of one another are $C_6$–$C_{20}$ aryl or alkyl-substituted $C_6$–$C_{20}$ aryl, and n is 0 to 5, and wherein the average n of the phosphate composition is about 0.3 to about 0.8.

12. The thermoplastic resin composition of claim 1 wherein said flame retardant is a phosphate composition of the general formula:

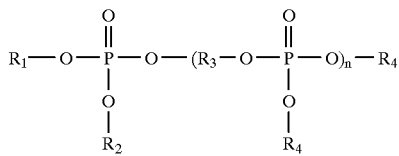

wherein $R_1$, $R_2$, $R_3$, $R_4$, and $R_5$ independently of one another are $C_6$–$C_{20}$ aryl or alkyl-substituted $C_6$–$C_{20}$ aryl, and n is 0 to 5, and wherein the average n of the phosphate composition is about 1.4.

13. The thermoplastic resin composition of claim 1 wherein said zeolite is a non-adduct zeolite.

14. The thermoplastic resin composition of claim 1 wherein said zeolite is a non-ion exchanged zeolite.

15. The thermoplastic resin composition of claim 1 wherein said zeolite is zeolite A or X having a pore size of 2 to 10 Å.

16. The thermoplastic resin composition of claim 1 wherein said resin composition further includes additives selected from the group consisting of anti-drip agents, inorganic fillers, heat stabilizers, oxidation inhibitors, light stabilizers, pigments, and dyes.

17. The thermoplastic resin composition of claim 16 wherein said resin composition contains an anti-drip agent selected from the group consisting of polytetrafluoroethylene, polyvinylidenefluoride, copolymer of tetrafluoroethylene and vinylidene fluoride, copolymer of tetrafluoroethylene and fluoroalkylvinylether, and copolymer of tetrafluoroethylene and hexafluoropropylene.

18. The thermoplastic resin composition of claim 1 wherein the base resin (A) is halogen-free.

19. The thermoplastic resin composition of claim 16 wherein the base resin (A) is present in an amount by weight that is the difference between the total weight of the resin composition and the sum of the weights of components (B) and (C) and the additive present in the resin composition.

20. A flameproof thermoplastic resin composition consisting essentially of:
(A) a base resin comprising:
 (1) 75 to 96% by weight of a thermoplastic, halogen-free polycarbonate,
 (2) 4 to 25% by weight of a styrene-containing graft copolymer, and
 (3) 0 to 10% by weight of a styrene-containing copolymer;
(B) 5 to 20 parts by weight, per 100 parts by weight of the base resin(A), of at least one organic phosphate flame retardant; and
(C) 0.05 to 10 parts by weight, per 100 parts by weight of the base resin (A), of a zeolite.

* * * * *